United States Patent [19]

Fletcher

[11] Patent Number: 4,713,783
[45] Date of Patent: Dec. 15, 1987

[54] DIGITAL TEMPERATURE INDICATING SYSTEM

[76] Inventor: Taylor C. Fletcher, 1534 Sunny Crest Dr., Fullerton, Calif. 92635

[21] Appl. No.: 747,882

[22] Filed: Jun. 24, 1985

[51] Int. Cl.⁴ .......................... G01K 7/00; G01K 7/26
[52] U.S. Cl. ................................... 364/557; 364/571; 374/158
[58] Field of Search ............... 364/200, 557, 900, 571; 377/49, 25; 73/342; 374/158, 171

[56] References Cited

U.S. PATENT DOCUMENTS

| | | | |
|---|---|---|---|
| 3,824,585 | 7/1974 | Meijer | 374/171 |
| 3,872,728 | 3/1975 | Joyce et al. | 374/158 |
| 4,031,365 | 6/1977 | Raggiotti et al. | 377/49 |
| 4,060,715 | 11/1977 | Scott | 364/557 |
| 4,161,880 | 7/1979 | Prosky | 73/342 |
| 4,162,036 | 7/1979 | Balduzzi et al. | 364/557 |
| 4,169,380 | 10/1979 | Mansfield et al. | 364/557 |
| 4,298,947 | 11/1981 | Tamura et al. | 364/557 |
| 4,479,190 | 10/1984 | Takai et al. | 364/571 |
| 4,480,312 | 10/1984 | Wingate | 364/557 |
| 4,528,637 | 7/1985 | Smith | 364/557 |
| 4,592,002 | 5/1986 | Bozarth, Jr. et al. | 364/571 |
| 4,651,292 | 3/1987 | Jeenicke et al. | 364/557 |

OTHER PUBLICATIONS

Microprocessor Interfacing, Heathkit Educational Systems, Heath Company, Benton Harbor, Michigan ©1982, written by: Prof. A. C. Staugaard, Jr.; Exp. 3.

Primary Examiner—Errol A. Krass
Assistant Examiner—Steven A. Melnick
Attorney, Agent, or Firm—Keith D. Beecher

[57] ABSTRACT

A digital temperature indicating system which enables a relatively inexpensive thermistor sensor to be used to obtain highly accurate temperature measurements over a number of relatively narrow temperature ranges, and to obtain acceptable temperature accuracy over an extended temperature range. The thermistor controls a bridge. The bridge produces an analog signal when the thermistor causes the bridge to become unbalanced from a null point as the thermistor senses different temperatures. The analog signal from the bridge is converted into digital signals which address memory locations in a programmable read-only memory (PROM) for both scaling and linearizing purposes. The resulting output signals from the PROM are used to control a display unit which displays the temperature readings.

6 Claims, 4 Drawing Figures

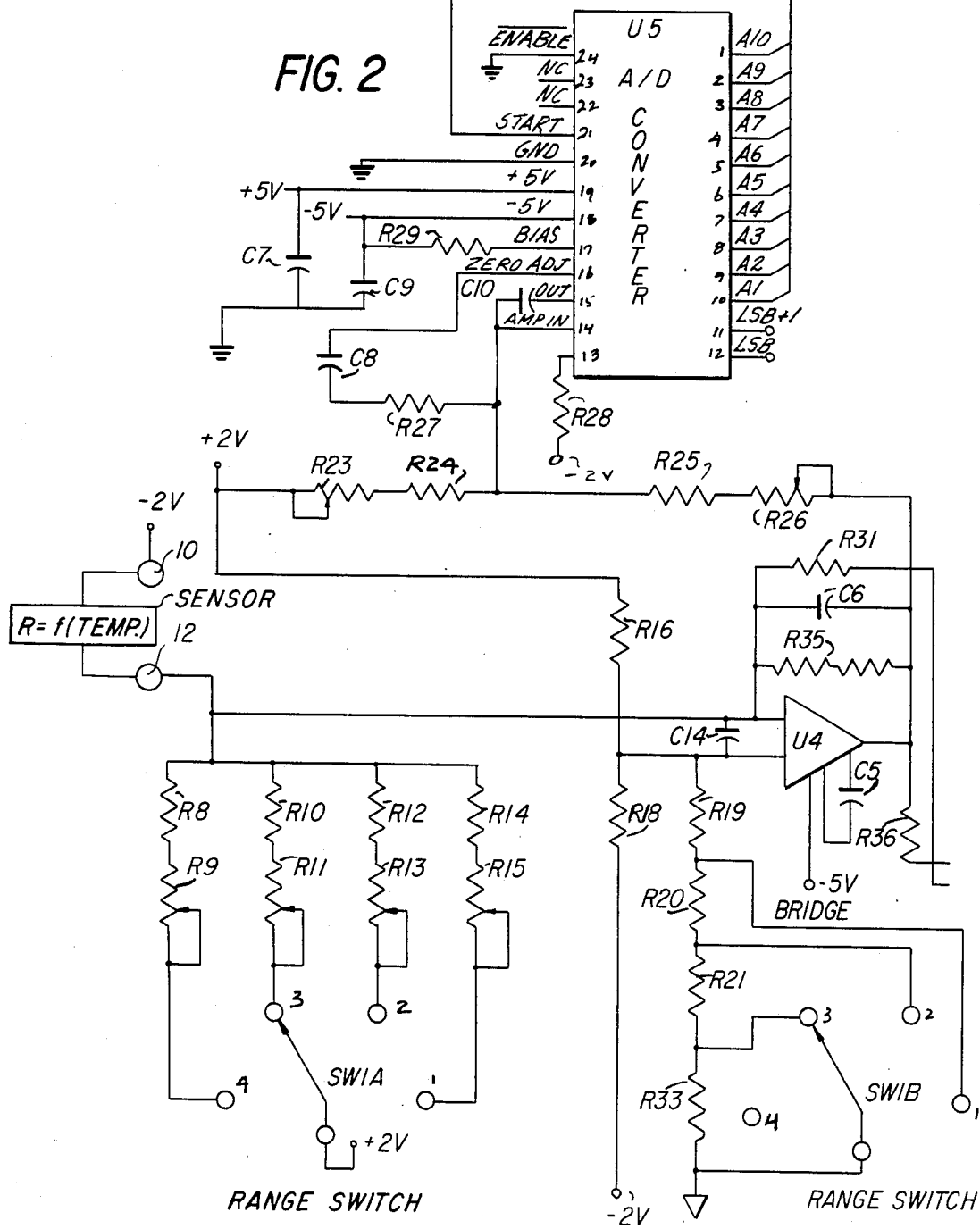

DIGITAL TEMPERATURE INDICATING SYSTEM

BACKGROUND OF THE INVENTION

An important objective of the invention is to provide a relatively simple and inexpensive system which enables available and inexpensive thermistors to be used to provide highly accurate temperature readings in one or more relatively narrow temperature ranges, and which is also capable of providing reasonably accurate temperature readings over extended temperature ranges.

A constructed embodiment of the invention has found particular use in medical laboratories for providing highly accurate temperature readings in the vicinities of 25° C., 30° C. and 37° C. In such an embodiment the center values are set at an expanded scale of 24°-26° C., 29°-31° C. and 36°-38° C., and a single scaling value is adjusted to make the readings accurate over their entire ranges. Similarly, the center value may be set on a wide range of, for example, 20°-40° C., and by reading one other point, the system may be calibrated accurately over the entire scale.

As stated above, the output signals from the bridge are digitized to create addresses for temperature values stored in memory. This serves to convert voltages that are non-linear, because of the characteristics of the thermistor and of the bridge, into accurate temperature readings. This linearizing technique is similar in some respects to the linearizing methods described in U.S. Pat. Nos. 3,824,585 and 4,169,380.

A feature of the system of the invention is its ability to provide accurate temperature readings over an extended range with high sensitivity. High sensitivity is obtained by the use of a thermistor sensor. The accuracy at the center of a selected temperature range is obtained by nulling the bridge circuit controlled by the thermistor at the center of the temperature range. The accuracy over the full scale is obtained by using the PROM table look-up technique, which, as mentioned, is similar to that described in the patents referred to above.

The PROM table is calculated by using the equation representing the basic characteristic of the thermistor, and the bridge, namely:

$$E_{out} = \left(\frac{E_{bridge}}{2}\right)\left(\frac{1}{R_o} - \frac{1}{R_x}\right) R_{Feedback} \quad (1)$$

Where:
$E_{out}$ = amplifier output voltage;
$E_{bridge}$ = voltage applied to the bridge;
$R_o$ = thermistor resistance when $E_{out}$ is zero;
$R_x$ = thermistor resistance at temperature T, and is given by equation (2);
$R_{Feedback}$ = resistance of feedback resistor connected between the amplifier output and the amplifier negative input.

$$R_x = R_o e^{(a+bT+cT2)}\left(\frac{1}{T} - \frac{1}{T_o}\right) \quad (2)$$

Where:
T = temperature of thermistor;
$T_o$ = temperature of thermistor when thermistor resistance is $R_o$;
a, b & c = characteristic values of thermistor material.

The PROM will then linearize any of a family of thermistors independently of the nominal resistance of the thermistor. That is, different thermistors fabricated from the same material but with different nominal resistance values may be used in the bridge circuit of the system of the invention without changing the linearizing table. For each thermistor, one adjustment is made to adjust the system gain, and a second adjustment is made to null the bridge circuit at the center of each temperature range for that particular thermistor.

Thermistors are available which are made of the same basic material, and such thermistors are usually inexpensive, especially if their nominal resistance values at the reference temperature (usually 25° C.) are not too critical.

As mentioned above, the PROM is actually used to correct for non-linearities both of the thermistor and also of the bridge circuit. The system to be described is equipped with range switches which enable several ranges of interest to be linearized using multiple look-up tables. The system described has three scales which require only a single system gain adjustment. However, a second system gain adjustment is used for an extended range (20–40 degree C.) to prevent the bridge amplifier from saturating.

SUMMARY OF THE INVENTION

A digital system which uses readily available inexpensive thermistors in conjunction with a bridge circuit and a linearizing PROM, and which provides accurate temperature measurements over one or more limited temperature ranges. Different thermistors may be connected into the system to provide accurate temperature measurements without any need to change the linearizing PROM, and merely by adjusting a null rheostat and a second rheostat to adjust the gain of the system.

BRIEF DESCRIPTION OF THE DRAWINGS

FIGS. 1, 2, 3 and 4 together form a schematic circuit diagram of one embodiment of the digital temperature monitoring system of the invention.

DETAILED DESCRIPTION OF THE ILLUSTRATED EMBODIMENT

Figure 3:
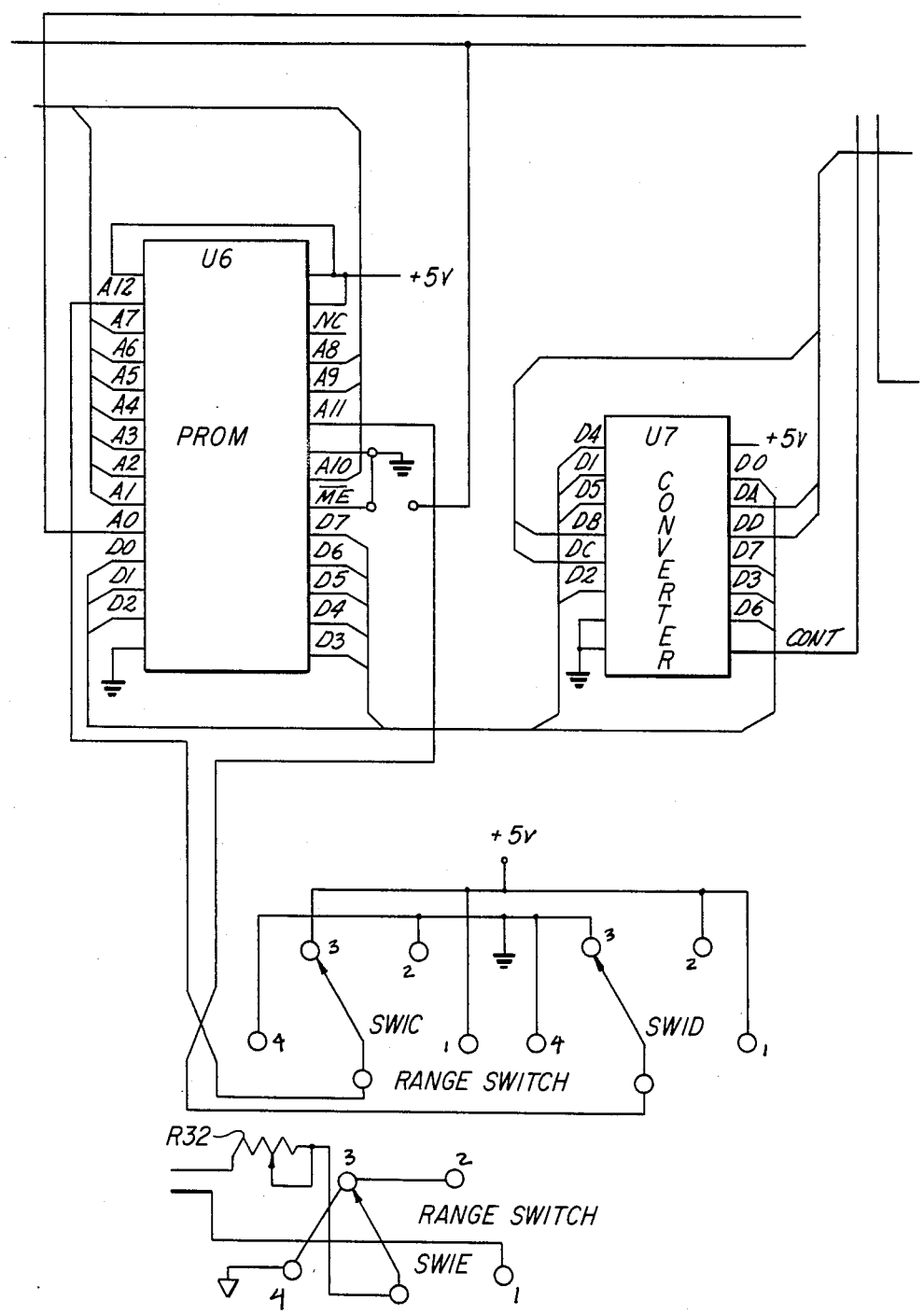
Figure 4:
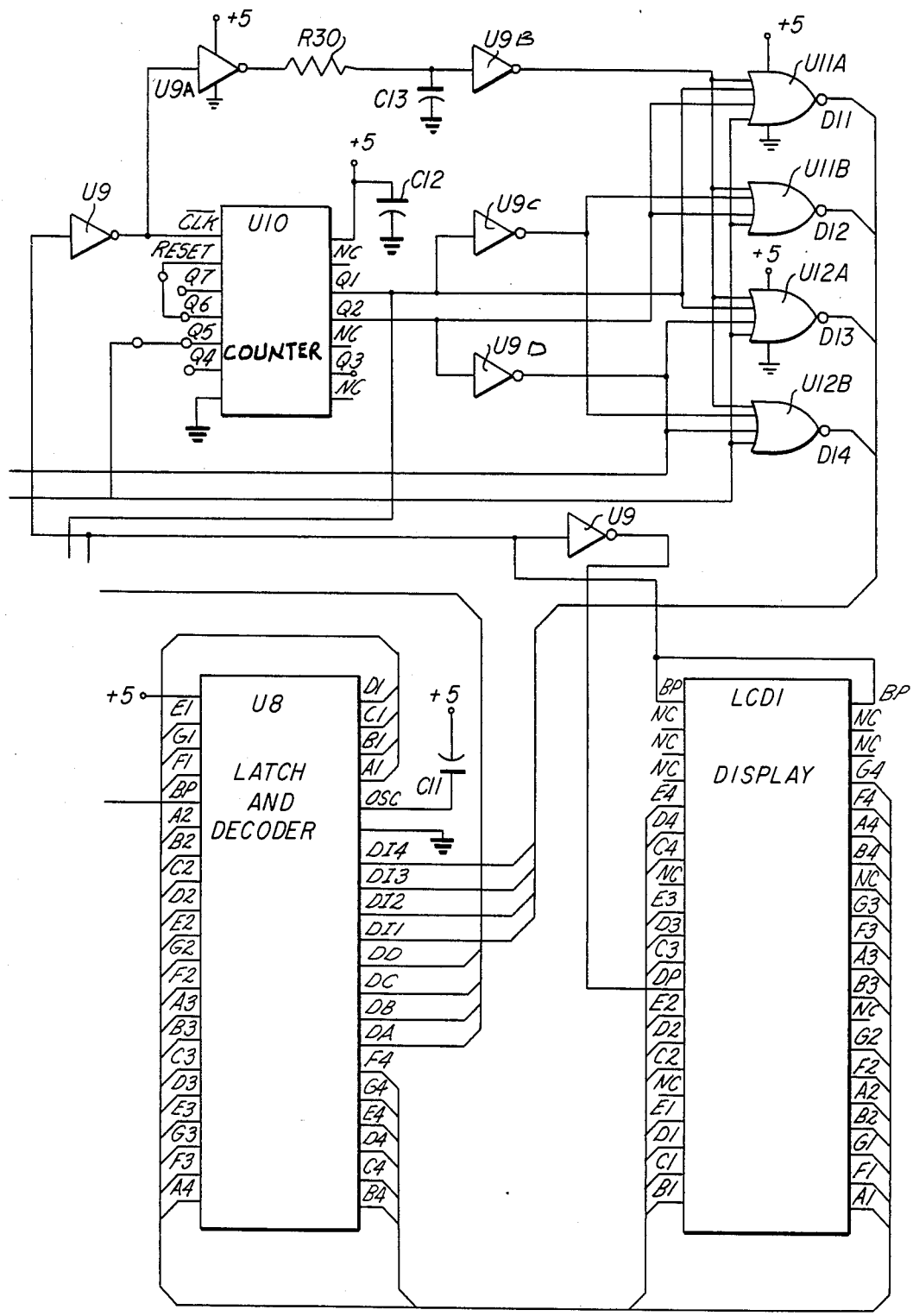

As shown in FIG. 1, the system of the invention includes a pair of input terminals 10 and 12, and a thermistor may be connected across the input terminals. One of the input terminals is connected to the negative terminal of a 2-volt source, and the other is connected to the negative input terminal of an operational amplifier U4, and to a number of range resistors designated R8, R10, R12 and R14. Resistor R8 may have a resistance of 56.2 kilo-ohms, resistor R10 may have a resistance of 76.8 kilo-ohms, resistor R12 may have a resistance of 97.6 kilo-ohms, and resistor R14 may have a resistance of 76.8 kilo-ohms. The range resistors are connected to a corresponding series of 5 kilo-ohm rheostats designated R9, R11, R13 and R15. The rheostats are connected to respective contacts of section SW1A of a range switch. The movable contact of the switch is connected to the positive terminal of a 2-volt source.

The negative input terminal of amplifier U4 is connected to a 165 kilo-ohm resistor R31 which, in turn, is connected to one of the fixed contacts of a second section SW1E of the range switch. The other fixed ends of section SW1E of the range switch are connected together and to ground. The output of amplifier U4 is connected to the movable contact of the section SW1E through a 20 kilo-ohm resistor R36 and through a 20 kilo-ohm rheostat R32.

The negative input terminal of the amplifer is also connected to a 47 microfarad capacitor C6 and to a 1.6 megohm resistor R35. Capacitor C6 and resistor R35 are connected to the output of amplifier U4.

The positive input terminal of amplifier U4 is connected to a 78.7 kilo-ohm resistor R18 which, in turn, is connected to the negative terminal of the 2-volt source. Resistor R18 is also connected to a 178 kilo-ohm resistor R19 which, in turn, is connected to a 1.10 megohm resistor R20 and to one of the fixed contacts of section SW1B of the range switch. The other side of resistor R20 is connected to a 324 kilo-ohm resistor R21 and to a second fixed contact of section SW1B of the range switch. Resistor R21 is connected to a grounded 590 kilo-ohm resistor R33 and to a third fixed contact of the range switch section SW1B. The movable contact of switch section SW1B is grounded.

The output of amplifier U4 is also connected through a 50 kilo-ohm rheostat R26 and through a 475 kilo-ohm resistor R25 to a 374 kilo-ohm resistor R24 which, in turn, is connected through a 50 kilo-ohm rheostat R23 to the positive terminal of the 2-volt source. A 0.001 microfarad capacitor C14 is connected across the input terminals of the amplifier U4. The junction of resistors R25 and R24 is connected to pin 14 of an analog/digital converter U5. This converter may be an integrated circuit of the type designated ADC-ET12BC.

The thermistor connected across terminals 10, 12; resistors R16, R18; and the range resistor and corresponding rheostat selected by section SW1A of the range switch form a bridge. The analog output from the bridge when it is unbalanced is amplified by amplifier U4.

To calibrate the bridge, the thermistor is placed in a temperature bath representing precisely the center temperature of a particular temperature range, and the range switch is set to that range. For example, for temperature readings in the 29°-31° C. range, the range switch is set to the illustrated position 3, and the thermistor reading corresponds exactly to 30° C. Rheostat R11 is then adjusted until the output of the amplifier U4 is zero.

Rheostat R23 is then adjusted so that the reading of the system is precisely at the middle of the selected temperature range, that is 30.00 degrees C. The thermistor is then placed in a 31 degrees C. bath, and rheostat R26 is adjusted so that the reading of the system is precisely at 31 degrees C. The system is now capable of providing accurate temperature readings throughout the 29-31 degree C. temperature range.

This one adjustment of R26 sets the system gain for all three scales with a 2 degree span, that is 24-46, 29-31 and 36-38 degrees C. The thermistor is now placed in a 25 degree C. bath with the range switch placed in Position 2. Rheostat R13 is adjusted until the output of U4 is zero. Similarly, the thermistor is placed in a 37 degree C. bath with the range switch in Position 4. Rheostat R9 is adjusted until the output of U4 is zero. At this time, the ranges 24-26, 29-31 and 36-38 degrees C. are fully calibrated.

The 20-40 degree C. scale is calibrated by placing the thermistor in a 30 degree C. temperature bath. The range switch is placed in Position 1, and R15 is adjusted until the output of U4 is zero. The thermistor is now placed in a 37 degree C. temperature bath and rheostat R32 is adjusted until the system displays 37.0 degrees C. This trims the gain for the 20-40 degree C. range and completes the calibration procedure. Replacing this thermistor with a new thermistor requires only the adjustment of R26 to set the system gain and the adjustments of R9, R11, R13 and R15 to set the mid-scale of each of the ranges.

For each range, the analog/digital converter U5 supplies address signals to PROM U6, which may be of the type designated TMS-2764. The PROM is programmed so that it responds to the various address signals from the analog/digital converter to supply data signals D0-D7 to a converter U7. As the sensed temperature changes up and down in each range with respect to the set center point, the change in resistance of the thermistor unbalances the bridge in one direction or the other with respect to its null point, so that corresponding analog signals are supplied to pin 14 of the analog/digital converter U5. These analog signals cause the converter to produce digital signals A1-A10 which address different locations in PROM U6; and the PROM, in turn, produces linearized temperature signals D0-D7 which have previously been programmed into the PROM.

The digital outputs A1-A10 from the analog-digital converter U5 represent 4 decimal digits of a temperature reading. These digital outputs are applied as address signals to PROM U6. When $A_o$ is high, the PROM produces linearized outputs $D_0$-$D_7$ representing the first and second digits. When $A_o$ is low the linearized outputs $D_0$-$D_7$ of the PROM represent the third and fourth digits.

The PROM outputs $D_0$-$D_7$ are applied to converter U7, which may be an integrated circuit of the type designated MC14551. When CONT is high the converter supplies outputs DA, DB, DC, DD to a latch and decoder U8, which may be of the type designated TSC7211A. When $A_o$ is high and CONT is high, these outputs represent the first digit. When $A_o$ is high and CONT is low, the converter outputs DA, DB, DC and DD represent the second digit. Then $A_o$ goes low and causes the PROM outputs to represent the third and fourth digits, which converter U7 now supplies in sequence to latch and decoder U8 as CONT goes high and then goes low. The latch and decoder U8 is controlled by selection signals DI1, DI2, DI3, DI4 to receive and latch the signals received from converter U7 during each cycle and represent the four decimal digits of the temperature reading during that cycle.

The latch and decoder U8 now outputs the decimal digit signals to a liquid crystal display LCD1 which may be of the type designated LCD5672R25H. The display has a seven segment section for each decimal digit, and latch and decoder outputs the signals representing the four digits to the display with each digit being identified by seven segment signals.

Latch and decoder U8 contains an internal clock generator which produces a 125 Hz BP (Back Plane) signal. In accordance with conventional practice the BP signal is applied to the display LCD1 effectively to reverse the polarity of the signals applied to the display on a repeated basis to improve the display characteristics. This BP signal is also used as a clock signal which is applied to the clock input of a counter, U10, which may be of the type designated CD4024BE. This counter, in conjunction with inverters U9A, U9B, U9C and gates U11A, U11B, U12A and U12B form a sequencer. The sequencer produces a first sequence signal Q5 which controls the analog-to-digital converter U5 to establish each cycle of temperature readings. The sequencer also produces a second sequence signal Q1, which serves as the control signal CONT for converter U7. Sequence signals Q1, Q2 and Q5 are also used to control NOR gates U11A, U11B, U12A and U12B which supply the selection signals DI1, DI2, DI3 and DI4 to the latch and decoder U8.

The invention provides, therefore, a digital temperature indicating system which is capable of obtaining accurate temperature readings by the use of relatively inexpensive temperature sensing devices and relatively simple associated electronic circuitry.

While a particular embodiment of the invention has been shown and described, modifications may be made. It is intended in the claims to cover all modifications which come within the true spirit and scope of the invention.

I claim:

1. A digital temperature indicating system comprising: a temperature sensor having an electrical resistance which is a function of the temperature being sensed; a bridge network connected to said sensor and including at least one variable resistance means for balancing the bridge at a particular resistance of said sensor representing a predetermined temperature; an analog-to-digital converter; first circuitry connecting the bridge network to the analog-to-digital converter for applying analog output signals of said bridge to said converter to be converted into corresponding digital signals by said converter; a memory connected to said converter to be addressed by said digital signals to produce corresponding temperature-indicating digital signals in response thereto; a display means; second circuitry connected to said memory and to said display means and responsive to said temperature-indicating signals to cause the display means to exhibit temperature readings; first further variable resistance means included in said first circuitry for controlling the output of said analog-to-digital converter to cause said display means to exhibit a selected temperature reading in a selected temperature range for a balanced condition of said bridge; and second further variable resistance means included in said first circuitry for controlling the output of said analog-digital converter to cause said display means to exhibit a second selected temperature in the selected temperature range for a particular unbalanced condition of said bridge.

2. The digital temperature indicating system defined in claim 1, and which includes a plurality of distinct variable resistance means for balancing said bridge, and range switching means for selectively switching said distinct variable resistance means into circuit with said bridge.

3. The digital temperature indicating system defined in claim 1, in which said first circuitry includes an amplifier for amplifying the analog output signals of said bridge supplied to said analog-to-digital converter.

4. The digital temperature indicating system defined in claim 1, in which said second circuitry includes a latch and decoder circuit which responds to the digital signals from said memory to provide control signals for said display to cause the display to exhibit the temperature readings.

5. The digital temperature indicating system defined in claim 4, in which said latch and decoder circuit includes an internal frequency generator for producing a back plane signal for the display means.

6. The digital temperature indicating system defined in claim 5, and which includes further circuitry connected to said latch and decoder circuit and responsive to said back plane signal for providing clock signals for said analog-to-digital converter, memory, and latch and decoder circuit.

* * * * *